US008299160B2

(12) United States Patent
Yamauchi et al.

(10) Patent No.: US 8,299,160 B2
(45) Date of Patent: Oct. 30, 2012

(54) RESIN COMPOSITION AND AUTOMOBILE UNDER-HOOD PARTS THEREOF

(75) Inventors: Kei Yamauchi, Tokyo (JP); Osamu Fujii, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 204 days.

(21) Appl. No.: 12/297,476

(22) PCT Filed: Apr. 17, 2007

(86) PCT No.: PCT/JP2007/058360
§ 371 (c)(1),
(2), (4) Date: Oct. 17, 2008

(87) PCT Pub. No.: WO2007/125784
PCT Pub. Date: Nov. 8, 2007

(65) Prior Publication Data
US 2009/0105392 A1  Apr. 23, 2009

(30) Foreign Application Priority Data

Apr. 27, 2006  (JP) ................................ 2006-123636

(51) Int. Cl.
*C08K 3/10* (2006.01)
(52) U.S. Cl. .......................... 524/413; 524/494; 523/222
(58) Field of Classification Search .................. 524/413, 524/494; 523/222
See application file for complete search history.

(56) References Cited

U.S. PATENT DOCUMENTS

| | | | | |
|---|---|---|---|---|
| 3,691,000 | A * | 9/1972 | Kalnin | 428/114 |
| 4,289,465 | A * | 9/1981 | Killmeyer et al. | 425/111 |
| 4,290,606 | A * | 9/1981 | Maxwell | 473/569 |
| 4,549,920 | A * | 10/1985 | Cogswell et al. | 156/181 |
| 4,762,763 | A | 8/1988 | Nomura et al. | |
| 4,812,343 | A * | 3/1989 | Kiekhaefer et al. | 428/35.6 |
| 4,845,003 | A | 7/1989 | Kiriu et al. | |
| 5,213,889 | A * | 5/1993 | Cogswell et al. | 428/332 |
| 5,371,132 | A | 12/1994 | Ebara et al. | |
| 6,548,167 | B1 * | 4/2003 | Mieck et al. | 428/371 |
| 6,890,984 | B2 | 5/2005 | Aramaki et al. | |
| 2001/0033928 | A1 * | 10/2001 | Kadowaki et al. | 428/361 |
| 2001/0047050 | A1 * | 11/2001 | Oyamada et al. | 524/494 |
| 2001/0048175 | A1 * | 12/2001 | Edwards et al. | 264/136 |
| 2002/0180112 | A1 * | 12/2002 | Kusy et al. | 264/479 |
| 2003/0045621 | A1 | 3/2003 | Aramaki et al. | |
| 2003/0125440 | A1 | 7/2003 | Tamura et al. | |
| 2003/0171494 | A1 * | 9/2003 | Aramaki et al. | 525/242 |
| 2003/0224275 | A1 | 12/2003 | Shimojo et al. | |
| 2004/0102559 | A1 * | 5/2004 | Oyamada et al. | 524/445 |
| 2005/0058820 | A1 * | 3/2005 | Kitano et al. | 428/297.4 |
| 2009/0069499 | A1 * | 3/2009 | Sarukawa | 524/606 |
| 2009/0176923 | A1 * | 7/2009 | Fujii et al. | 524/494 |

FOREIGN PATENT DOCUMENTS

| | | |
|---|---|---|
| CN | 1104225 A | 6/1995 |
| CN | 1362980 A | 8/2002 |
| JP | 62-163061 | 7/1987 |
| JP | 63-002074 | 1/1988 |
| JP | 63-033755 | 2/1988 |
| JP | 63-37694 | 7/1988 |
| JP | 63-208865 | 8/1988 |
| JP | 63-237065 | 10/1988 |
| JP | 64-010261 | 1/1989 |
| JP | 4-083262 | 3/1992 |
| JP | 5-162124 | 6/1993 |
| JP | 6-32979 | 2/1994 |
| JP | 10-292107 | 11/1998 |
| JP | 11-343406 | 12/1999 |
| JP | 2000-273299 | 10/2000 |
| JP | 2002-082475 | 3/2002 |
| JP | 2002-179910 | 6/2002 |
| JP | 2003-55549 | 2/2003 |
| JP | 2003-175512 | 6/2003 |
| JP | 2003175512 A * | 6/2003 |
| JP | 2003-241429 | 8/2003 |
| JP | 2003-337444 | 11/2003 |
| JP | 2003-345069 | 12/2003 |
| JP | 2004-155927 | 6/2004 |
| JP | 2004-315606 | 11/2004 |
| JP | 2005-298663 | 10/2005 |
| JP | 2005-324733 | 11/2005 |
| WO | WO-2005/007727 * | 1/2005 |

OTHER PUBLICATIONS

Machine language translation of JP 2003-175512 Aa.*
English Language Abstract of JP 10-292107.
English Language Abstract of JP2004-315606.
English Language Abstract of JP 2004-155927.
English Language Abstract of JP 2000-273299.
English Language Abstract of JP 11-343406.
English Language Abstract of JP 5-162124.
English Language Abstract of JP 6-32979.
English Language Abstract of JP 2003-55549.
English Language Abstract of JP 2002-179910.
English Language Abstract of JP 2003-175512.

(Continued)

*Primary Examiner* — Doris Lee
(74) *Attorney, Agent, or Firm* — Greenblum & Bernstein, P.L.C.

(57) ABSTRACT

A resin composition including 30 to 90% by mass of polyamide (A), 70 to 10% by mass of glass fibers (B), a copper compound (C) and a halogenated compound (D), wherein polyamide (A) has a sum of a terminal carboxyl group concentration and a terminal amino group concentration of 100 milliequivalents/kg or more and 200 milliequivalents/kg or less, the terminal carboxyl group concentration being higher than the terminal amino group concentration; glass fibers (B) have a fiber diameter of 10 to 20 μm and a weight average fiber length of 5 to 30 mm; the content of copper based on polyamide (A) is 30 ppm or more and 200 ppm or less; and the molar ratio of halogen to copper (halogen/copper) is more than 5 and not more than 25.

14 Claims, No Drawings

OTHER PUBLICATIONS

English Language Abstract of JP 2005-298663.
English Language Abstract of JP 2005-324733.
Chinese Office Action that issued with respect to patent family member Chinese Patent App. No. 200780015181.3, dated Jun. 3, 2010, along with a partial English language translation thereof.
European Search Report for European Application No. 07741796.2, dated May 31, 2012.
European Office Action issue with respect to European Application No. 07741796.2, dated Jun. 18, 2012.

* cited by examiner

RESIN COMPOSITION AND AUTOMOBILE UNDER-HOOD PARTS THEREOF

TECHNICAL FIELD

The present invention relates to a resin composition reinforced with long glass fibers, and to automobile underhood components manufactured from the resin composition.

BACKGROUND ART

Reinforced thermoplastic resin compositions in which glass fibers are blended are excellent in mechanical characteristics (such as impact strength and flexural properties) and moldability. Therefore, they can be substituted for metal materials used for manufacturing various components. Thus, it is possible to produce lighter components and reduce components count. Reinforced thermoplastic resin compositions blended with long glass fibers are known as molding materials providing moldings excellent particularly in mechanical strength because they suffer less damage of the fibers when molded (for example, refer to Patent Documents 1 and 2).

On the other hand, polyamide is a thermoplastic resin widely used in automobiles, machine-related materials, building materials, home equipment components, and the like. It is disclosed that a terminal group ratio of polyamide is defined for improving thermal stability and weatherability in a resin composition containing polyamide (for example, refer to Patent Documents 3, 4 and 5).

Automobile components are liable to be degraded due to heat. However, use of a resin composition excellent in thermal stability as a raw material will prolong product life of resultant components. As a thermal stabilizer used for this purpose, examples of a copper compound and an iodine compound are disclosed (for example, refer to Patent Documents 3, 4 and 5).

However, automobile underhood components (for example, engine head covers, oil pans, chain covers, oil filter brackets, crankshaft brackets, and the like), which are used at higher temperatures for a long period of time than other common automobile components and require close contact with other metal components and air tightness, are required to have impact resistance, dimensional stability and the like in addition to higher thermal stability. In this respect, conventional resin compositions have been unsatisfactory.

Patent Document 1: Japanese Patent Publication No. 63-37694
Patent Document 2: Japanese Patent Laid-Open No. 5-162124
Patent Document 3: Japanese Patent Laid-Open No. 6-32979
Patent Document 4: Japanese Patent Laid-Open No. 2003-55549
Patent Document 5: Japanese Patent Laid-Open No. 2002-179910

DISCLOSURE OF THE INVENTION

Problems to be Solved by the Invention

It is an object of the present invention to provide a resin composition excellent in impact resistance, thermal stability, and creep resistance. It is another object of the present invention to provide an automobile underhood component obtained by injection molding of the resin composition, wherein the component exhibits minimal reduction in mechanical characteristics in the transverse direction relative to those in the flow direction, and has reduced anisotropy of mold shrinkage factor between the flow direction and the transverse direction orthogonal thereto and reduced warpage.

Means for Solving the Problems

As a result of exhaustive studies, it has been found that a resin composition reinforced with long glass fibers is effective, in which copper compound (C) and halogenated compound (D) are contained in a specific proportion in polyamide (A) having a specific amount of terminal groups and glass fibers (B) having a specific shape, resulting in accomplishment of the present invention.

Thus, the present invention is as follows.

(1)
A resin composition comprising from 30 to 90% by mass of a polyamide (A), from 70 to 10% by mass of glass fibers (B), a copper compound (C) and a halogenated compound (D), wherein:
 the polyamide (A) has a sum of a terminal carboxyl group concentration and a terminal amino group concentration of 100 milliequivalents/kg or more and 200 milliequivalents/kg or less and the terminal carboxyl group concentration is higher than the terminal amino group concentration;
 the glass fibers (B) have a fiber diameter from 10 to 20 μm and a weight average fiber length from 5 to 30 mm;
 a content of copper based on the polyamide (A) is 30 ppm or more and 200 ppm or less; and
 a molar ratio of halogen to copper (halogen/copper) is more than 5 and not more than 25.

(2)
The resin composition described in item (1), wherein the halogenated compound (D) is an iodine compound and is present as particles having a particle size of 20 μm or less in the resin composition.

(3)
The resin composition described in item (1) or (2), wherein the polyamide (A) is a polyamide 66.

(4)
The resin composition described in item (1) or (2), wherein the polyamide (A) is a semiaromatic polyamide.

(5)
The resin composition described in item (1) or (2), wherein the polyamide (A) is a polyamide 66/6C copolymer.

(6)
The resin composition described in item (1) or (2), wherein the polyamide (A) is a mixture of a polyamide 66 and a polyamide 612.

(7)
The resin composition described in any of items (1) to (6), wherein the resin composition has a form of a pellet and the glass fibers (B) have a weight average fiber length greater than a length of the pellets.

(8)
A molded article comprising from 30 to 90% by mass of a polyamide (A), from 70 to 10% by mass of glass fibers (B), a copper compound (C) and a halogenated compound (D), wherein:
 the polyamide (A) has a sum of a terminal carboxyl group concentration and a terminal amino group concentration of 100 milliequivalents/kg or more and 200 milliequivalents/kg or less and the terminal carboxyl group concentration is higher than the terminal amino group concentration;
 the glass fibers (B) have a fiber diameter from 10 to 20 μm and a weight average fiber length from 1.5 to 5 mm;
 the halogenated compound (D) is an iodine compound and has a particle size of 20 μm or less;

a content of copper based on the polyamide (A) is 30 ppm or more and 200 ppm or less; and a molar ratio of halogen to copper (halogen/copper) is more than 5 and not more than 25.

(9)

An automobile underhood component obtained by injection-molding a resin composition described in any of items (1) to (7).

Advantages of the Invention

According to the present invention, there can be obtained a resin composition excellent in impact resistance and having excellent mechanical characteristics, high creep performance, and the like even after used at higher temperatures for a long period of time. Molded articles obtained by injection-molding the resin composition also keep the physical properties as described above. Therefore, the molded articles have long product life. In addition, the molded articles have reduced anisotropy of molding shrinkage factor and warpage. This allows substitution for components used in an automobile engine room, for example, metal components such as engine head covers, oil pans, and chain covers. This leads also to lighter components.

BEST MODE FOR CARRYING OUT THE INVENTION

The present invention will be specifically described hereinafter.

Polyamide (A) is not particularly limited as long as it satisfies the requirements of the terminal groups. Specifically, examples of the polyamide which can be used include a homopolymer alone, a copolymer alone, a combination of homopolymers, a combination of copolymers and a combination of copolymers and homopolymers, and the like, which are obtained by properly combining ε-caprolactam, adipic acid, sebacic acid, dodecanedioic acid, isophthalic acid, terephthalic acid, hexamethylenediamine, tetramethylenediamine, 2-methylpentamethylenediamine, 2,2,4-trimethylhexamethylenediamine, 2,4,4-trimethylhexamethylenediamine, metaxylylenediamine, bis(3-methyl-4-aminocyclohexyl)methane, and/or the like.

Specific examples of such polyamides include homopolymers such as polyamide 6, polyamide 66, polyamide 610, polyamide 612, polyamide 11, polyamide 12, polyamide MXD6, a polyamide obtained by polymerizing hexamethylenediamine and isophthalic acid (polyamide 6I), and a polyamide obtained by polymerizing isophthalic acid and bis(3-methyl-4-aminocyclohexyl)methane (polyamide PACMI); a polyamide obtained by polymerizing adipic acid, isophthalic acid, and hexamethylenediamine (polyamide 66/6I copolymer); a polyamide obtained by polymerizing adipic acid, terephthalic acid, and hexamethylenediamine (polyamide 66/6T copolymer); a polyamide obtained by polymerizing adipic acid, cyclohexane, and hexamethylenediamine (polyamide 66/6C copolymer); a polyamide obtained by polymerizing isophthalic acid, terephthalic acid, and hexamethylenediamine (polyamide 6I/6T copolymer); a polyamide obtained by polymerizing adipic acid, isophthalic acid, terephthalic acid, and hexamethylenediamine (polyamide 66/6I/6T copolymer); a polyamide obtained by polymerizing terephthalic acid, 2,2,4-trimethylhexamethylenediamine, and 2,4,4-trimethylhexamethylenediamine (polyamide TMDT copolymer); a copolyamide obtained by polymerizing isophthalic acid, terephthalic acid, hexamethylenediamine, and bis(3-methyl-4-aminocyclohexyl)methane; a mixture of a copolyamide obtained by polymerizing isophthalic acid, terephthalic acid, hexamethylenediamine, and bis(3-methyl-4-aminocyclohexyl)methane with polyamide 6; a mixture of polyamide MXD6 and polyamide 66; and the like.

Among others, semiaromatic polyamides such as polyamide 66, polyamide 66/6C copolymer, polyamide 66/6C/6I copolymer, polyamide 66/6T copolymer and polyamide 66/6T/6I copolymer have high melting points and are suitable for components requiring higher thermal stability, for example, components used in an automobile engine room.

In addition, the crystallization temperatures of semiaromatic polyamides such as polyamide 66/6I copolymer and polyamide MXD6 or mixtures of these semiaromatic polyamides and other aliphatic polyamides can be controlled as appropriate by adjusting the copolymerization or mixing ratios thereof. This prevents exposure of glass fibers to the surface of molded articles. Therefore, those polymers are suitable for obtaining molded articles excellent in appearance.

Since a mixture of polyamide 66 and a polyamide having a long ethylene chain such as polyamide 612 or polyamide 610 is excellent in hydrolysis resistance in high temperature water, it is suitable for components which are exposed to hot water or the like, for example, cooler system components in an automobile engine room. In addition, polyamide 612 having a long ethylene chain is particularly suitable also in terms of durability to calcium chloride, which is a snow-melting agent scattered in cold climate areas.

Well-known processes can be used as a method for preparing polyamide (A). Such processes include, for example, a thermal melting process, a solution process using a dicarboxylic acid halide component and a diamine component, and the like. Among others, the thermal melting process is the most effective, in which polymerization may be performed either batch-wise or continuously. Polymerization apparatuses are not particularly limited, but known apparatuses can be used, for example, continuous reactors, autoclave reactors, tumbler reactors, and extruder reactors such as kneaders.

The sum of the terminal amino group concentration and the terminal carboxyl group concentration in polyamide (A) of the present invention is 100 milliequivalents/kg or more in terms of impregnation of the resin into long glass fiber bundles and 200 milliequivalents/kg or less in terms of mechanical characteristics. The sum of the terminal amino group concentration and the terminal carboxyl group concentration is more preferably from 110 to 150 milliequivalents/kg, most preferably ranging from 115 to 140 milliequivalents/kg. Moreover, in polyamide (A) of the present invention, the terminal carboxyl group concentration needs to be higher than the terminal amino group concentration in terms of thermal stability in an extruder during melt kneading or in a cylinder during injection molding and in terms of suppressing deposition of a copper compound for imparting thermal stability.

Examples of the method for measuring the terminal amino group concentration include a method in which a predetermined amount of the sample is dissolved in a 90% aqueous phenol solution and the resultant solution is subjected to potentiometric titration with 1/50 N hydrochloric acid at 25° C. followed by calculation of the concentration.

Examples of the method for measuring the terminal carboxyl group concentration include a method in which a predetermined amount of the sample is dissolved in benzyl alcohol at 160° C. and the resultant solution is titrated with a 1/10 N—NaOH ethylene glycol solution using phenolphthalein as an indicator followed by calculation of the concentration.

The terminal amino group concentration of polyamide (A) can be controlled by adding (incorporating) one or more of monocarboxylic acids, dicarboxylic acids, monoamines, and diamines to a raw material monomer of the polyamide as a terminal group regulator. Specific examples of the terminal group regulator include the followings:

Monocarboxylic acids: acetic acid, propionic acid, butyric acid, valeric acid, caproic acid, capryl acid, lauric acid, undecanoic acid, tridecyl acid, myristyl acid, palmitic acid, stearic acid, pivalic acid, isobutyl acid, cyclohexane carboxylic acid, benzoic acid, toluic acid, α-naphthalene carboxylic acid, β-naphthalene carboxylic acid, methylnaphthalene carboxylic acid, phenyl acetic acid, and the like;

Dicarboxylic acids: malonic acid, dimethylmalonic acid, succinic acid, glutaric acid, adipic acid, 2-methyl adipic acid, trimethyl adipic acid, pimelic acid, 2,2-dimethyl glutaric acid, 3,3-diethyl succinic acid, azelaic acid, sebacic acid, suberic acid, dodecane diacid, eicodionic acid, terephthalic acid, isophthalic acid, naphthalene dicarboxylic acid, 2-chloro terephthalic acid, 2-methyl terephthalic acid, 5-methyl isophthalic acid, 5-sodium sulfoisophthalic acid, hexahydroterephthalic acid, diglycol acid;

Monoamines: methyl amine, ethyl amine, propyl amine, butyl amine, hexyl amine, octyl amine, decyl amine, stearyl amine, dimethyl amine, diethyl amine, dipropyl amine, dibutyl amine, cyclohexyl amine, dicyclohexyl amine, aniline, toluidine, diphenyl amine, naphthyl amine, and the like; and Diamines: tetramethylene diamine, hexamethylene diamine, octamethylene diamine, decamethylene diamine, undecamethylene diamine, dodecamethylene diamine, 2-methylpentamethylene diamine, nonamethylene diamine, 2,2,4-trimethyl hexamethylene diamine, 2,4,4-trimethyl hexamethylene diamine, 5-methyl nonamethylene diamine, 2,4-dimethyl octamethylene diamine, methaxylylene diamine, paraxylylene diamine, 1,3-bis(aminomethyl)cyclohexane, 3,8-bis(aminomethyl)tricyclodecane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethyl piperazine, and the like. Use of acetic acid, adipic acid, hexyl amine, hexamethylene diamine, and the like is preferred in terms of productivity.

Moisture content of polyamide (A) is not particularly limited, but the polyamide preferably has a pellet moisture content of 0.1% by mass or more in order to suppress the increase of molecular weight thereof during melting. Preferably, the melt-kneading is performed by using a polyamide in which the pellet moisture content is adjusted to 0.5% by mass or less in order to suppress hydrolysis during the melting of polyamide.

Glass fibers (B) have a fiber diameter of 10 μm or more in terms of impregnation properties of the resin and 20 μm or less in terms of mechanical characteristics. The range of the average glass fiber diameter is more preferably from 10 to 17 μm, particularly preferably from 13 to 17 μm.

The fiber diameter of glass fibers (B) is measured in the following manner.
(i) The glass fibers are burned at 800° C. in an electric furnace until substantially no resin component is present.
(ii) Using polyethylene glycol, the resultant glass fibers are extended on a slide glass so gently as not to damage the fibers.
(iii) The glass fibers are observed under a light microscope, and the thickness of about 50 to 100 glass fibers randomly selected is measured using an image analyzer IP-1000 manufactured by Asahi Kasei Corporation, followed by determining the number average glass fiber diameter in the pellet composition.

The weight average fiber length of glass fibers (B) in the resin composition is in the range from 5 mm to 30 mm. Fibers having a weight average fiber length of 5 mm or more would exert a reinforcing effect in the resultant injection molded article.

In particular, the fibers exert excellent thermal stability in a high temperature atmosphere. Specifically, it provides molded articles excellent in flexural strength and creep performance and having long product life. In addition, it has reduced anisotropy of mold shrinkage factor between the flow direction and the transverse direction orthogonal thereto and reduced warpage, for example, in injection molding, which offers a major advantage in the design of components. Further, suppression of reduction in strength in the transverse direction provides an advantage that product life is prolonged and the position of a gate can be selected more freely. With a weight average fiber length of not more than 30 mm, the resin composition can be easily supplied in molding without using special equipment and the like. The range of the weight average fiber length is more preferably from 8 mm to 20 mm, particularly preferably from 10 mm to 15 mm.

The weight average fiber length in a molded article comprising the resin composition is preferably from about 1.5 mm to 5 mm, more preferably ranging from 2 mm to 4 mm. For example, according to a known pultrusion method employing continuous glass fiber rovings, a resin composition can be produced which has a weight average fiber length in the range of the long glass fiber-reinforced thermoplastic resin composition. The resin composition is more preferably produced by a pultrusion method as described in Japanese Patent Laid-Open No. 2003-175512 which is devised to twist the glass fibers.

As described herein, the pellet length means the distance between the sections of each pellet when the resin composition in strand form is cut orthogonal to the strand to form pellets. When the resin composition is formed into a pellet which is one form thereof, the weight average fiber length of glass fibers (B) is preferably greater than the pellet length because this provides reinforcement effect of glass fibers and improves impregnation between glass fibers and the resin composition.

The blending ratio of polyamide (A) in the resin composition is from 30 to 90% by mass. The ratio is preferably 30% by mass or more for sufficiently impregnating long glass fiber bundles with polyamide (A). The ratio is preferably 90% by mass or less for obtaining sufficient mechanical characteristics. The ratio is more preferably from 35 to 75% by mass, particularly preferably from 66 to 40% by mass. Further, the blending ratio of glass fibers (B) is preferably from 70 to 10% by mass. Obtaining sufficient mechanical characteristics requires 10% by mass or more of glass fibers (B). In addition, sufficiently impregnating glass fiber bundles with polyamide (A) requires 70% by mass or less of glass fibers (B). The blending ratio of glass fibers (B) is more preferably from 65 to 25% by mass, particularly preferably from 60 to 34% by mass.

Glass fibers (B) are not particularly limited as long as the above physical properties are satisfied. Those used in conventional reinforced thermoplastic resins can be used.

In addition, there is used glass fibers (B) to which surface a coupling agent, a sizing agent, or the like is allowed, as appropriate, to adhere. Specific examples of the coupling agent include amino-based coupling agents, epoxy-based coupling agents, chlorine-based coupling agents, cation-based silane coupling agents, aminosilane-based coupling agents, and the like. Specific examples of the sizing agent include maleic anhydride-, urethane- and acryl-based sizing agents. Alternatively, they include sizing agents containing copolymers of maleic anhydride, urethanes or acrylics, or mixtures thereof.

Examples of copper compound (C) include copper iodide, cuprous bromide, cupric bromide, cuprous chloride, copper acetate, copper propionate, copper benzoate, copper adipate, copper terephthalate, copper isophthalate, and the like. Among others, copper iodide and copper acetate are preferred, and copper iodide is particularly preferred.

Examples of halogenated compound (D) include potassium iodide, magnesium iodide, ammonium iodide, potassium bromide, potassium chloride, sodium chloride, and the like. Among others, potassium iodide is preferred. These compounds may be used alone, or in combination of two or more thereof.

Further, the maximum particle size of halogenated compound (D) in the composition is preferably 20 μm or less in terms of preventing breakage of glass fibers during pellet production and injection molding, more preferably 15 μm or less, particularly preferably 10 μm or less.

The method for measuring the particle size of halogenated compound (D) in the composition is as follows:
(i) The section of the pellets or molded articles is polished.
(ii) It is analyzed by a scanning electron microscope with an element analyzer for identifying halogenated compounds such as iodine compounds or bromine compounds.
(iii) The particle size of 100 to 200 particles of the halogenated compounds randomly selected is measured to determine the number average particle size and the maximum particle size.

The copper concentration contained in copper compound (C) and halogenated compound (D) is required to be 30 ppm or more based on polyamide (A) in terms of thermal stability. In addition, if the concentration is 200 ppm or less, it is possible not only to impart sufficient thermal stability but also to control deposition of copper metal and discoloration during the melting of polyamide. A more preferred range is 50 ppm≦copper≦180 ppm, and a particularly preferred range is 90 ppm≦copper≦140 ppm.

Further, the molar ratio of halogen to copper (halogen/copper) in the resin composition is more than 5 and not more than 25. The halogen/copper is more than in terms of suppressing the deposition of copper metal during the melting of polyamide. The halogen/copper is not more than 25 in order to suppress elution of halogen from the molded article after injection molding and to suppress corrosion of an injection machine screw. A more preferred range is 10≦halogen/copper≦25, and a particularly preferred range is 10≦halogen/copper≦22.

Copper is quantitatively determined in the following manner.
(i) A sample is weighed so as to provide 0.5 g as a component excluding glass from the resin composition, and 20 ml of concentrated sulfuric acid is added to the weighed sample to subject the sample to wet decomposition on a heater.
(ii) After cooling, the decomposed sample is mixed with 5 ml of hydrogen peroxide, heated on a heater, and concentrated to a total amount of 2 to 3 ml.
(iii) After cooling, the sample which is mixed with pure water to 500 ml is quantitatively determined by inductively coupled plasma (ICP) emission spectrometry using IRIS/IP manufactured by Thermo Jarrell Ash.

Halogen was quantitatively determined in the following manner.
(i) A sample (pellet or molded article) is accurately weighed, put into a flask replaced with oxygen, and allowed to be decomposed by burning.
(ii) A gas generated during burning is absorbed into an absorbing liquid (containing one drop of hydrazine hydrate in 25 ml of ultrapure water).
(iii) The absorbing liquid after measuring the volume thereof was subjected to ion chromatography.
ICS-2000 manufactured by Nippon Dionex K.K. was used as a measuring device with a column: Ion Pac AG18AS18 and a detector: an electric conductivity detector. The measurement conditions are as follows: eluent: KOH gradient, injection volume of eluent: 50 μl. The concentration of halogen in the sample was calculated according to the following equation:

Concentration in sample(wt %)=[measurement result of absorbing liquid(ppm)−blank test result (ppm)]×(25 ml×1000)/(amount of sample collected(mg)×10,000)

Where appropriate, the resin composition may also contain, in such an extent that the object of the present invention is not impaired, additives used in thermoplastic resins, such as an antioxidant, an ultraviolet absorber, a thermal stabilizer, a photodegradation inhibitor, a plasticizer, a lubricant, a mold-releasing agent, a nucleating agent, a flame retardant, and a coloring dye/pigment. A different thermoplastic resin may be also blended.

Copper compound (C), halogenated compound (D), and other additives may be added in polymerization of polyamide, or may be melt-kneaded in a single-screw or twin-screw extruder at the production of the resin composition. Alternatively, they may be melt-kneaded in a cylinder of an injection molding machine using a master batch blend when the resin composition of the present invention is molded.

In the present invention, a resin composition is produced in which glass fibers (B) are incorporated into polyamide (A), copper compound (C) and halogenated compound (D) by a known pultrusion method, or by a pultrusion method devised to twist the glass fibers as described in Japanese Patent Laid-Open No. 2003-175512.

Automobile underhood components of the present invention are components positioned under an automobile hood, in particular, those in an engine room and around a suspension which require close contact with other metal components including air tightness and joining therewith. Examples of the automobile underhood components include cylinder head covers, oil pans, chain covers, oil filter brackets, crankshaft brackets, intake manifolds, surge tanks, power steering oil tanks, air suspension tanks, radiator tanks, engine mounts, torque rods, and the like. These are molded by injection molding. In addition, a special molding method can be selected such as gas-assisted injection molding or melt-core molding. Further, automobile underhood components can also be obtained from a plurality of molded articles through fabrication such as vibration welding, ultrasonic welding, laser welding and hot-plate welding.

EXAMPLES

The present invention is specifically described below based on Examples and Comparative Examples. However, the present invention is not intended to be limited thereto in any manner. Raw materials and evaluation methods used in Examples and Comparative Examples are described below.
<Raw Materials>
(A) Polyamide
A-1: Polyamide 66
Terminal amino group concentration: 44 milliequivalents/kg, terminal carboxyl group concentration: 81 milliequivalents/kg, (solution viscosity $\eta_r$: 2.78)

A-2: Polyamide 66/6I (82/18 wt %) Copolymer

Terminal amino group concentration: 45 milliequivalents/kg, terminal carboxyl group concentration: 123 milliequivalents/kg, (solution viscosity $\eta_r$: 2.51)

A-3: Polyamide 66/6T (80/20 wt %) Copolymer

Terminal amino group concentration: 45 milliequivalents/kg, terminal carboxyl group concentration: 68 milliequivalents/kg, (solution viscosity $\eta_r$: 2.90)

A-4: Polyamide 66

Terminal amino group concentration: 83 milliequivalents/kg, terminal carboxyl group concentration: 44 milliequivalents/kg, (solution viscosity $\eta_r$: 2.79)

Specifically, the solution viscosity was measured at 25° C. using an Ostwald viscometer, wherein the solution was obtained by dissolving polyamide (A) in 98±0.05% sulfuric acid at a resin concentration of 1.0 g/dl.

(B) Glass Fibers

B-1: Glass Rovings T-428 Manufactured by Nippon Electric Glass Co., Ltd., Each Formed of a Bundle of about 4,200 Glass Filaments Having a Filament Diameter of 17 μm B-2: Glass Rovings T-428 Manufactured by Nippon Electric Glass Co., Ltd., Each Formed of a Bundle of about 3,200 Glass Filaments Having a Filament Diameter of 10 μm B-3: Glass Rovings T-428 Manufactured by Nippon Electric Glass Co., Ltd., Each Formed of a Bundle of about 3,800 Glass Filaments Having a Filament Diameter of 13 μm (C) Copper Compound C-1: Copper Iodide Manufactured by Wako Pure Chemical Industries, Ltd.

(D) Halogenated Compound

D-1: Potassium Iodide Manufactured by Wako Pure Chemical Industries, Ltd.

D-2: Potassium Bromide Manufactured by Wako Pure Chemical Industries, Ltd.

(C•D) A Granular Mixture of the above Copper Compound and Halogen Compound: The Particle Size was Adjusted by Grinding and Using a Mesh.

C•D-1:

85 parts by mass of potassium iodide (20 to 200 μm), 10 parts by mass of ethylene-bis-stearamide, and 5 parts by mass of copper iodide (average particle size 2 μm) were mixed and ground to a maximum particle size of 5 μm. To 100 parts by mass of polyamide (A-1) was melt-kneaded 24 parts by mass of the ground product to obtain a granular mixture.

Melting conditions: Twin screw extruder (co-rotating twin-screw type, L/D=60, L: screw length, D: screw diameter, D=ϕ30)

Rotational speed of screw: 100 rpm

Cylinder temperature: 280° C.

C•D-2: A granular mixture was obtained in the same manner as in C•D-1 except that the mixture was ground to a maximum particle size of 15 μm.

C•D-3: A granular mixture was obtained in the same manner as in C•D-1 except that the mixture was ground to a maximum particle size of 50 μm.

C•D-4: A granular mixture was obtained in the same manner as in C•D-1 except that the mixture was ground to a maximum particle size of 30 μm.

In the present invention, no change was found between the particle size of C•D-1, C•D-2, C•D-3, or C•D-4 when it is added and that in molded articles.

When the particle size was too small to measure, it was shown as "not observable" in Tables 1 and 2.

A particle size of 0.01 μm or less cannot be analyzed according to the analytical method of the present specification.

<Method for Producing Pellets>

(1) Pultrusion Method Imparting a Twist (Examples, Comparative Examples 1 to 5, Comparative Examples 7 to 9)

Melting apparatus: twin-screw extruder ZSK25 manufactured by Coperion Corporation Barrel temperature: 310° C.

Rotational speed of screw: 300 rpm

Pellet production apparatus: the apparatus for producing long fiber-reinforced resins manufactured by Kobe Steel, Ltd. described in detail in Japanese Patent Laid-Open No. 2003-175512, which comprises a crosshead provided with a roller for impregnating resins.

Polyamide (A), copper compound (C), and halogenated compound (D) were melt-blended. The molten blend was fed to the crosshead. Glass fibers (B), which was composed of two rovings (glass fiber bundles), was introduced from a roving platform into the crosshead filled with the molten blend. The glass fibers impregnated with the molten blend in the crosshead were continuously drawn through a nozzle to provide one strand. The glass fibers impregnated with the molten blend, which were drawn as one strand, were cool-solidified in a water-cooled bath. Then, cylindrical pellets each having a length of about 10 mm and a diameter of about 3 mm were obtained by use of a pelletizer. In the taking-off, the strand was twisted by turning round on its axis in the direction of taking-off the strand.

The adjustment of the content of glass fibers (B) in the resin composition was performed by controlling the take-off speed of the glass fiber rovings and the discharge rate of the molten blend in Comparative Example 7 contains only polyamide (A).

The resultant pellets were evaluated.

(2) Direct GF Addition Method (Comparative Examples 6, 10)

Melting apparatus: twin-screw extruder ZSK40MC2 manufactured by Coperion Corporation Rotational speed of screw: 480 rpm Barrel temperature: 295° C.

Discharge: 90 kg/hr

The molten blend was charged in an amount of 45 kg/hr, and the content of glass fibers was adjusted to be about 50% by mass.

Glass fibers (B), which was composed of two rovings (glass fiber bundles), was directly introduced from a roving platform into downstream of the resin melting position of the extruder barrel. The glass fibers were continuously extruded from a die outlet having a diameter of 5 mm and cool-solidified. Then, pellets each having a length of about 10 mm and a diameter of about 3 mm were obtained by use of a pelletizer.

<Evaluation Method>

(1) Glass fiber content: The glass fiber content of the resultant pellet was determined by a combustion method according to ISO 3451-4.

(2) Weight average fiber length (a) Pellets

Equipment: Image analyzer IP-1000 manufactured by Asahi Kasei Corporation

Sample: Glass fibers in the pellets subjected to the following treatment.

(i) The pellets are burned at 800° C. in an electric furnace until substantially no resin component is present.

(ii) Using polyethylene glycol, the residue is spread on a slide glass so gently as not to damage the fibers.

(iii) About 300 to 500 glass fibers randomly selected are measured for length by light microscopy, followed by determining the weight average fiber length.

(b) Molded Articles (i) The pellets are injection-molded according to the following procedure.

Injection molding machine: Injection molding machine FN3000 manufactured by Nissei Plastic Industrial Co., Ltd.

Cylinder temperature: 310° C.

Mold temperature: 80 to 120° C.

Fill time Injection pressure and speed was properly adjusted so as to provide a fill time of about 1 second.

Shape of molded article: ISO 178 strip specimen

Sample: Glass fibers present in a cut piece of a specimen and subjected to the same treatment as in the above (a) (the specimen was cut at twice the length of the pellets used from the end part in the flow direction when it was injection molded.)

(ii) Observation and measurement are performed in the same manner as in (a) to determine weight average fiber length in the molded article.

(3) Charpy Impact Strength

Molding method: In the same manner as described in the above (2) (b).

Shape of molded article: a flat plate specimen of 150× 150×4 mm (gate size: 6×4 mm, gate position: located at the middle of one side of the square-form specimen.

Sample: Samples were cut out of the above molded article in the flow and transverse directions when it was injection molded.

The Charpy impact strength of the resultant specimens was measured according to ISO 179-1. It is preferable that the specimens have higher values.

(4) Flexural Strength at Break, Flexural Modulus

Molding method: In the same manner as described in the above (2) (b).

Preliminary treatment condition: Left to stand at 120° C. for 1 hr

Measurement temperature: 120° C.

Flexural properties were measured according to ISO 178. The specimens having higher values of flexural strength at break and flexural modulus are excellent in thermal stability.

(5) Thermal Stability (Flexural Strength at Break)

Molding method: In the same manner as described in the above (2) (b).

Measurement equipment: High Temp Oven PHH-201 manufactured by Espec Corp.

Preliminary treatment condition: Left to stand at 200° C. for 2,000 hrs

Measurement temperature: 23° C.

Flexural strength at break was measured according to ISO 178. The specimens having higher values are excellent in thermal stability.

(6) Creep Rupture Stress

Molding method: In the same manner as described in the above (2) (b).

Sample: Specimens according to ASTM D1822, which were cut out so that the flow direction in injection molding was orthogonal to the evaluation direction of the specimens.

Equipment: creep tester for 6 specimens, type: 145-PC, manufactured by Yasuda Seiki Seisakusho Ltd.

A sample is applied with an arbitrary load ranging from 60 to 90% of the tensile strength at break at 120° C. A stress value which breaks the sample at a stress loading time of 1,000 hours is derived from a plot of time-to-break with load stress by a logarithmic approximation. The specimens having higher values are excellent in creep properties.

(7) Molding Shrinkage Factor

Molding method: In the same manner as described in the above (2) (b).

Treatment condition: Allowed to stand at a temperature of 23° C. and a relative humidity of 50% for 24 hours.

Measurement locations: In the flow and transverse directions in injection molding Mold reference dimensions: Mold dimensions at the mold temperature during molding (i) Molded articles are measured for dimensions thereof with an accuracy of 0.1 mm using a slide caliper.

(ii) The difference between the dimension of a specimen in each measurement direction and the mold reference dimension divided by the mold reference dimension and multiplied by 100, and the obtained value was defined as a mold shrinkage factor. It is preferable that the molding shrinkage factors are lower and the ratio between the molding shrinkage factors in the flow and transverse directions is closer to 1. When the ratio between the molding shrinkage factors in the flow and transverse directions is closer to 1, the mold shrinkage factors are said to be free from anisotropy.

(8) Warpage (i) The pellets are injection-molded according to the following procedure.

Injection molding machine: Injection molding machine 650 MG-110 manufactured by Mitsubishi Heavy Industries Plastic Technology Co., Ltd.

Cylinder temperature: 310° C.

Mold temperature: from 80 to 120° C.

Filling speed: Injection pressure and speed was properly adjusted so as to provide a filling speed of about 100 cc/sec.

Mold: Cylinder head cover owned by Asahi Kasei Chemicals Corp.

Shape of the sample: longitudinal dimension 450 mm, transverse dimension 160 mm, height 75 mm, average thickness 4 mm (ii) The above molded article is measured under the following conditions.

Treatment condition: Allowed to stand at a temperature of 23° C. and a relative humidity of 50% for 24 hours.

Measurement equipment: Three-dimensional measuring machine AE122MICROCOORD, Analyzing software GEOPACK700 manufactured by Mitutoyo Corporation A sample is fixed on a surface plate so as not to be loose, and arbitrary 3 points are set on a flange surface joining with a metal component so that these points cover as large an area as possible, thus providing an assumed plane. Then, evenly spaced 40 points are set on the flange surface to provide a correction plane. The vertical distances Z between the resultant correction plane and the points of measurement are calculated. The maximum absolute value of the vertical distances Z was defined as the maximum warpage. A sample having a smaller maximum warpage is excellent.

(9) Corrosion Rate: Pellets were Measured According to the Following Conditions.

Drying condition: At 80° C. for 24 hours

Carbon steel: SS400, 20 mm×10 mm×2 mm (i) Dried pellets are put in a metal closed vessel, and a surface-polished carbon steel is placed at the center of the vessel so that it is in contact with the resin pellets.

(ii) The internal atmosphere of the metal vessel is replaced by nitrogen, followed by 6-hour-standing in an oven having an atmospheric temperature of 280° C.

(iii) The carbon steel was taken out of the vessel after sufficient cooling, and the surface of the carbon steel was observed for the damaged parts using a metal microscope. When no corrosion was observed, the pellet was defined as "good";

when discoloration due to corrosion was observed, the pellet was defined as "fair"; and when damage due to corrosion was observed, the pellet was defined as "poor".

(10) The Number of Unsplit Glass Fibers

Sample: 50 molded articles obtained in the same manner as in the above (2) (b) except that they are black-colored with a dye.

A surface of the samples was observed, and the number of glass fibers floating out without being impregnated with resin was measured.

EXAMPLE 1

A-1 was selected as polyamide (A). In polymerization thereof, C-1 as copper compound (C) and D-1 as halogenated compound (D) were added thereto. The addition amount was adjusted so that the copper concentration based on polyamide (A) was 130 ppm and the molar ratio of iodine/copper was 20. B-1 was used as glass fibers (B), whose content was adjusted to 50% by mass. The pellets obtained by the production method (1) were evaluated according to the methods as described above.

EXAMPLE 2

Pellets were obtained by the same method as in Example 1 except for adjusting the glass fiber content to about 30% by mass.

EXAMPLE 3

Pellets were obtained by the same method as in Example 1 except for adjusting the glass fiber content to about 65% by mass.

EXAMPLE 4

Pellets were obtained by the same method as in Example 1 except that C-1 and D-1 were added in the polymerization of polyamide 66/6I (A-2) to obtain a polyamide having a copper concentration of 100 ppm based on polyamide (A) and a molar ratio of iodine/copper of 20; B-2 was used as glass fibers; and the extruder barrel temperature was set at 290° C. in the preparation of the composition.

EXAMPLE 5

Pellets were obtained by the same method as in Example 4 except for adjusting the glass fiber content to about 30% by mass.

EXAMPLE 6

Pellets were obtained by the same method as in Example 1 except that C-1 and D-1 were added in the polymerization of polyamide 66/6T (A-3) to obtain a polyamide having a copper concentration of 100 ppm based on polyamide (A) and a molar ratio of iodine/copper of 15; B-1 was used as glass fibers; and the extruder barrel temperature was set at 320° C. in the preparation of the composition.

EXAMPLE 7

Pellets were obtained by the same method as in Example 1 except that polyamide 66 resin (A-1) and C•D-1 were simultaneously charged as a mixture into a twin-screw extruder to prepare the pellets by adjusting the mixture so as to provide a copper concentration of 130 ppm based on polyamide (A) and a molar ratio of iodine/copper of 20.

EXAMPLE 8

Pellets were obtained by the same method as in Example 7 except for using C•D-2 for a copper compound and an iodine compound.

EXAMPLE 9

Pellets were obtained by the same method as in Example 1 except for preparing the pellets without twisting strand in taking off the same.

EXAMPLE 10

Pellets were obtained by the same method as in Example 1 except that polyamide 66 resin (A-1) and C•D-3 were simultaneously charged as a mixture into a twin-screw extruder to prepare the pellets by adjusting the mixture so as to provide a copper concentration of 130 ppm based on polyamide (A) and a molar ratio of iodine/copper of 20.

EXAMPLE 11

Pellets were obtained by the same method as in Example 1 except that C-1 and D-1 were added in the polymerization of polyamide 66 (A-1) to obtain a polyamide having a copper concentration of 130 ppm based on polyamide (A) and a molar ratio of bromine/copper of 7.

EXAMPLE 12

Pellets were obtained by the same method as in Example 1 except that polyamide 66 resin (A-1) and C•D-4 were simultaneously charged as a mixture into a twin-screw extruder to prepare the pellets by adjusting the mixture so as to provide a copper concentration of 130 ppm based on polyamide (A) and a molar ratio of iodine/copper of 20.

COMPARATIVE EXAMPLE 1

Pellets were obtained by the same method as in Example 1 except for using a polyamide which was prepared by adding C-1 and D-1 in the polymerization of polyamide 66 (A-1) and had a copper concentration of 10 ppm based on polyamide (A) and a molar ratio of iodine/copper of 20.

COMPARATIVE EXAMPLE 2

Pellets were obtained by the same method as in Example 2 except for using a polyamide which was prepared by adding C-1 and D-1 in the polymerization of polyamide 66 (A-1) and had a copper concentration of 10 ppm based on polyamide (A) and a molar ratio of iodine/copper of 20.

COMPARATIVE EXAMPLE 3

Pellets were obtained by the same method as in Example 3 except for using a polyamide which was prepared by adding C-1 and D-1 in the polymerization of polyamide 66 (A-1) and had a copper concentration of 130 ppm based on polyamide (A) and a molar ratio of iodine/copper of 5.

COMPARATIVE EXAMPLE 4

Pellets were obtained by the same method as in Comparative Example 1 except for using a polyamide which was prepared by adding C-1 and D-1 in the polymerization of polyamide 66 (A-1) and had a copper concentration of 250 ppm based on polyamide (A) and a molar ratio of iodine/copper of 20.

COMPARATIVE EXAMPLE 5

Pellets were obtained by the same method as in Example 1 except for using a polyamide which was prepared by adding C-1 and D-1 in the polymerization of polyamide 66 (A-4) and had a copper concentration of 130 ppm based on polyamide (A) and a molar ratio of iodine/copper of 20; and using B-3 as glass fibers.

COMPARATIVE EXAMPLE 6

Pellets were obtained by the same method as in Comparative Example 5 except that the pellets were produced by the production method (2).

COMPARATIVE EXAMPLE 7

Pellets were obtained by the same method as in Example 4 except for using a polyamide in which C-1 and D-1 were not added in the polymerization of polyamide 66/6I (A-2).

COMPARATIVE EXAMPLE 8

Pellets were obtained by the same method as in Example 5 except for using a polyamide which was prepared by adding C-1 and D-1 in the polymerization of polyamide 66/6I (A-2) and had a copper concentration of 10 ppm based on polyamide (A) and a molar ratio of iodine/copper of 20.

COMPARATIVE EXAMPLE 9

Pellets were obtained by the same method as in Example 6 except for using a polyamide which was prepared by adding C-1 and D-1 in the polymerization of polyamide 66/6T (A-3) and had a copper concentration of 10 ppm based on polyamide (A) and a molar ratio of iodine/copper of 20.

COMPARATIVE EXAMPLE 10

Pellets were obtained by the same method as in Comparative Example 6 except that polyamide 66 resin (A-1) and C•D-3 were simultaneously charged as a mixture into a twin-screw extruder to prepare the pellets by adjusting the mixture so as to provide a copper concentration of 130 ppm based on polyamide (A) and a molar ratio of iodine/copper of 20.

The evaluation results of Examples 1 to 12 are shown in Table 1. The evaluation results of Comparative Examples 1 to 10 are shown in Table 2.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Type of polyamide | 66 | 66 | 66 | 66/6I | 66/6I | 66/6T | 66 | 66 | 66 | 66 | 66 | 66 |
| $NH_2$ group (meq/kg) | 44 | 44 | 44 | 45 | 45 | 45 | 44 | 44 | 44 | 44 | 44 | 44 |
| COOH group (meq/kg) | 81 | 81 | 81 | 123 | 123 | 68 | 81 | 81 | 81 | 81 | 81 | 81 |
| Copper content (ppm) | 130 | 130 | 130 | 100 | 100 | 100 | 130 | 130 | 130 | 130 | 130 | 130 |
| Halogen/copper | 20 | 20 | 20 | 20 | 20 | 15 | 20 | 20 | 20 | 20 | 7 | 20 |
| Maximum particle size of halogen compound (μm) | | | Not observable | | | | 5 | 15 | Not observable | 50 | Not observable | 30 |
| Glass fiber content (%) | 50 | 30 | 65 | 50 | 30 | 50 | 50 | 50 | 50 | 50 | 50 | 50 |
| Glass fiber (B) diameter (μm) | 17 | 17 | 17 | 10 | 10 | 17 | 17 | 17 | 17 | 17 | 17 | 17 |
| Weight average glass fiber length in pellet (mm) | 11.3 | 11.4 | 11.3 | 11.3 | 11.3 | 11.3 | 11.3 | 11.3 | 10 | 11.3 | 11.3 | 11.3 |
| Weight average glass fiber length in molding (μm) | 2300 | 2800 | 2250 | 2300 | 2750 | 2300 | 2300 | 2250 | 2300 | 1850 | 2300 | 1950 |
| Flexural strength at break (MPa) | 99 | 85 | 117 | 100 | 83 | 115 | 99 | 96 | 99 | 94 | 99 | 94 |
| Flexural modulus (GPa) | 2.5 | 2.0 | 3.4 | 2.3 | 1.9 | 2.6 | 2.5 | 2.5 | 2.5 | 2.4 | 2.5 | 2.4 |
| Charpy impact strength ($KJ/m^2$) | 21.2 | 15.6 | 23.4 | 17.0 | 12.4 | 19.3 | 21.2 | 21.0 | 19.8 | 18.2 | 21.2 | 19.3 |
| Thermal stability (flexural strength at break) (MPa) after exposure to 200° C., 2000 hrs | 293 | 264 | 307 | 265 | 240 | 330 | 293 | 289 | 293 | 285 | 293 | 286 |
| Creep rupture stress (MPa), proof stress at 120° C. 1000 hrs | 61 | 54 | 64 | 60 | 54 | 66 | 61 | 60 | 59 | 55 | 61 | 56 |
| Molding shrinkage factor in flow direction (%) | 0.23 | 0.31 | 0.22 | 0.21 | 0.25 | 0.20 | 0.23 | 0.24 | 0.23 | 0.25 | 0.23 | 0.25 |
| Molding shrinkage factor in transverse direction (%) | 0.31 | 0.42 | 0.30 | 0.28 | 0.39 | 0.29 | 0.31 | 0.32 | 0.31 | 0.45 | 0.31 | 0.43 |
| Ratio between molding shrinkage factors: flow/transverse | 0.74 | 0.74 | 0.73 | 0.75 | 0.64 | 0.70 | 0.74 | 0.75 | 0.74 | 0.56 | 0.74 | 0.58 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- |
| Maximum warpage of molding (mm) | 1.2 | 2 | 1.4 | 1.4 | 1.9 | 1.3 | 1.2 | 1.3 | 1.2 | 1.8 | 1.2 | 1.7 |
| Corrosion rate | Good | Good | Good | Good | Good | Good | Good | Good | Good | Good | Fair | Good |
| Number of unsplit glass fibers on molding surface | 0 | 0 | 0 | 0 | 0 | 0 | 0 | 0 | 2 | 0 | 0 | 0 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
| --- | --- | --- | --- | --- | --- | --- | --- | --- | --- | --- |
| Type of polyamide | 66 | 66 | 66 | 66 | 66 | 66 | 66/6I | 66/6I | 66/6T | 66 |
| $NH_2$ group (meq/kg) | 44 | 44 | 44 | 44 | 83 | 83 | 45 | 45 | 45 | 44 |
| COOH group (meq/kg) | 81 | 81 | 81 | 81 | 44 | 44 | 123 | 123 | 68 | 81 |
| Copper content (ppm) | 10 | 10 | 130 | 250 | 130 | 130 | 0 | 10 | 10 | 130 |
| Halogen/copper | 20 | 20 | 5 | 20 | 20 | 20 | 0 | 20 | 20 | 20 |
| Maximum particle size of halogen compound (μm) |  |  | Not observable |  |  |  | — |  | Not observable | 50 |
| Glass fiber content (%) | 50 | 30 | 65 | 50 | 50 | 50 | 50 | 30 | 50 | 50 |
| Glass fiber (B) diameter (μm) | 17 | 17 | 17 | 17 | 13 | 13 | 10 | 10 | 17 | 13 |
| Weight average glass fiber length in pellet (mm) | 11.3 | 11.4 | 11.3 | 11.3 | 11.3 | 2.7 | 11.3 | 11.4 | 11.3 | 2.6 |
| Weight average glass fiber length in molding (μm) | 2250 | 2800 | 2200 | 2150 | 2250 | 640 | 2300 | 2800 | 2250 | 630 |
| Flexural strength at break (MPa) | 100 | 84 | 115 | 98 | 101 | 88 | 100 | 85 | 115 | 82 |
| Flexural modulus (GPa) | 2.5 | 2.0 | 3.4 | 2.4 | 2.5 | 2.2 | 2.3 | 1.9 | 2.6 | 2.3 |
| Charpy impact strength ($KJ/m^2$) | 21.0 | 15.5 | 23.5 | 20.9 | 21.3 | 11.5 | 17.0 | 12.5 | 19.4 | 11.2 |
| Thermal stability (flexural strength at break) (MPa) after exposure to 200° C., 2000 hrs | 9 | 7 | 290 | 293 | 285 | 254 | Not measurable | 6 | 12 | 252 |
| Creep rupture stress (MPa), proof stress at 120° C. 1000 hrs | 59 | 52 | 64 | 61 | 58 | 40 | 57 | 51 | 65 | 40 |
| Molding shrinkage factor in flow direction (%) | 0.23 | 0.27 | 0.22 | 0.24 | 0.23 | 0.27 | 0.21 | 0.26 | 0.20 | 0.28 |
| Molding shrinkage factor in transverse direction (%) | 0.31 | 0.43 | 0.30 | 0.33 | 0.30 | 0.49 | 0.28 | 0.40 | 0.29 | 0.51 |
| Ratio between molding shrinkage factors: flow/transverse | 0.74 | 0.63 | 0.73 | 0.72 | 0.77 | 0.55 | 0.75 | 0.65 | 0.69 | 0.55 |
| Maximum warpage of molding (mm) | 1.5 | 2.1 | 1.3 | 1.5 | 1.4 | 2.8 | 1.4 | 1.8 | 1.3 | 2.9 |
| Corrosion rate | Good | Good | Poor | Copper deposition | Copper deposition | Copper deposition | Poor | Good | Good | Good |
| Number of unsplit glass fibers on molding surface | 0 | 0 | 0 | 0 | 0 | 0 | 0 | 0 | 0 | 0 |

When compared with Comparative Examples 1 and 2 in the same glass fiber diameter and content, Examples 1 and 2 are excellent in the thermal stability.

When compared with Comparative Examples 7 and 8, Examples 4 and 5 are excellent in the thermal stability.

Also in the comparison of Example 6 with Comparative Example 9, the above similar effects are noted in the thermal stability.

When compared with Comparative Examples 3 and 4 in the same glass content, Examples 1, 3, and 9 are excellent in the corrosion rate.

Examples 1 and 9 are excellent in the thermal stability when compared with Comparative Example 5, and in the flexural strength, flexural modulus, impact resistance, mold shrinkage factor, and maximum warpage of moldings when compared with Comparative Example 6.

Comparison of Examples 8, 10, and 12 shows that Example 8, 12, and 10 are excellent in impact strength, warpage, and creep rupture stress in this order. This is probably because the difference of the particle size of halogen compound (D) causes a difference in the extent of glass fiber breakage.

It is shown that corrosion rate is excellent when the content of a copper compound and an iodine compound satisfies the requirements of the present invention and the terminal group concentration is within the scope of the present invention.

Further, it is shown that performance is sufficiently exerted when the terminal group concentration satisfies the requirements of the present invention and the content of a copper compound and an iodine compound is within the scope of the present invention.

Although the present invention has been described in detail and with reference to specific embodiments, it is apparent to those skilled in the art that a variety of changes and modifications may be made without departing from the spirit and scope of the present invention.

The present application is based on Japanese Patent Application No. 2006-123636 filed on Apr. 27, 2006, the contents of which are incorporated herein by reference.

INDUSTRIAL APPLICABILITY

The present invention can be suitably utilized in the field of automobile underhood components which are used at higher temperatures for a long period of time and require close contact with other metal components and air tightness.

The invention claimed is:

1. A resin composition comprising from 30 to 90% by mass of a polyamide (A), from 70 to 10% by mass of glass fibers (B), a copper compound (C), and a halogenated compound (D), wherein:
    the polyamide (A) has a sum of a terminal carboxyl group concentration and a terminal amino group concentration of 100 milliequivalents/kg or more and 200 milliequivalents/kg or less and the terminal carboxyl group concentration is higher than the terminal amino group concentration;
    the glass fibers (B) have a fiber diameter from 10 to 20 μm, a weight average fiber length from 5 to 30 mm, and a twisted form;
    a content of copper based on polyamide (A) is 30 ppm or more and 200 ppm or less;
    a molar ratio of halogen to copper (halogen/copper) is more than 5 and not more than 25;
    the resin composition is in the form of pellets, and the glass fibers (B) have a weight average fiber length greater than the length of the pellets; and
    the halogenated compound (D) is present as particles having a particle size of 20 μm or less in the resin composition.

2. The resin composition according to claim 1, wherein the halogenated compound (D) is an iodine compound.

3. The resin composition according to claim 1, wherein the polyamide (A) is a polyamide 66.

4. The resin composition according to claim 1, wherein the polyamide (A) is a semiaromatic polyamide.

5. The resin composition according to claim 1, wherein the polyamide (A) is a polyamide 66/6C copolymer.

6. The resin composition according to claim 1, wherein the polyamide (A) is a mixture of a polyamide 66 and a polyamide 612.

7. The resin composition according to claim 1, wherein the glass fibers (B) have a weight average fiber length from 8 to 20 mm.

8. A molded article comprising the resin composition according to claim 1, wherein the ratio of the molding shrinkage factor in the flow direction to the molding shrinkage factor in the transverse direction is from 0.64 to 1.

9. The molded article comprising the resin composition according to claim 8, wherein the ratio of the molding shrinkage factor in the flow direction to the molding shrinkage factor in the transverse direction is from 0.64 to 0.75.

10. The molded article according to claim 8, wherein the maximum warpage value is 2 mm or less.

11. The molded article according to claim 10, wherein the maximum warpage value is from 1.2 to 2 mm.

12. A molded article comprising the resin according to claim 1, wherein the ratio of the molding shrinkage factor in the flow direction to the molding shrinkage factor in the transverse direction is from 0.64 to 0.75, the maximum warpage value is from 1.2 to 2 mm, and the content of copper based on polyamide (A) is from 100 ppm to 130 ppm.

13. An automobile underhood component obtained by injection-molding a resin composition according to claim 1.

14. A molded article comprising from 30 to 90% by mass of a polyamide (A), from 70 to 10% by mass of glass fibers (B), a copper compound (C) and a halogenated compound (D), wherein:
    the polyamide (A) has a sum of a terminal carboxyl group concentration and a terminal amino group concentration of 100 milliequivalents/kg or more and 200 milliequivalents/kg or less and the terminal carboxyl group concentration is higher than the terminal amino group concentration;
    the glass fibers (B) have a fiber diameter from 10 to 20 μm and a weight average fiber length from 1.5 to 5 mm;
    the halogenated compound (D) is an iodine compound and has a particle size of 20 μm or less;
    a content of copper based on the polyamide (A) is 30 ppm or more and 200 ppm or less; and
    a molar ratio of halogen to copper (halogen/copper) is more than 5 and not more than 25.

* * * * *